United States Patent [19]

Kühnlein

[11] 3,903,462

[45] Sept. 2, 1975

[54] MEASUREMENT OF THE ELAPSED TIME DURING ONE ROTATION OF THE ROTOR OF A BRUSHLESS DC MOTOR

[75] Inventor: Hans Kühnlein, Nurnberg-Grossgrundlach, Germany

[73] Assignee: Siemens Aktiengesellschaft, Munich, Germany

[22] Filed: May 30, 1974

[21] Appl. No.: 474,654

[30] Foreign Application Priority Data
June 14, 1973 Germany............................ 2330309

[52] U.S. Cl.................................. 318/138; 328/129
[51] Int. Cl.²................... G04F 10/10; G01R 29/02
[58] Field of Search ........... 318/138, 139, 685, 694, 318/254, 439; 307/246; 328/129, 151; 324/181, 189

[56] References Cited
UNITED STATES PATENTS

| | | | |
|---|---|---|---|
| 3,492,424 | 8/1970 | Hare et al. | 328/129 |
| 3,611,343 | 6/1969 | Schoenbach | 340/271 |
| 3,805,127 | 4/1974 | Svendsen | 318/139 |

*Primary Examiner*—Robert K. Schaefer
*Assistant Examiner*—John W. Redman
*Attorney, Agent, or Firm*—Kenyon & Kenyon Reilly Carr & Chapin

[57] ABSTRACT

A method and apparatus for measuring the time elapsed during one revolution of the rotor of a brushless direct current motor in which control signals emitted by position sensors associated with the motor are supplied to integrating storage elements thereby storing values which are proportional to the time required for the rotor to make one revolution and permitting a measurement of the elapsed time through interrogation of the integrated values.

5 Claims, 2 Drawing Figures

MEASUREMENT OF THE ELAPSED TIME DURING ONE ROTATION OF THE ROTOR OF A BRUSHLESS DC MOTOR

BACKGROUND OF THE INVENTION

This invention relates to brushless direct current motors in general and more particularly to a method and apparatus for measuring the time elapsed during one revolution of such a motor.

In various devices where accurate speed control must be maintained such as in casette tape recorders, there is difficulty in obtaining a suitable control variable for regulation to a constant tape velocity. The tape velocity of a recorder is proportional to the sum of the squares of the time required by both reels to make one revolution apiece. If the sum remains constant, the tape velocity is also constant. The time elapsing during one revolution is a quantity which can be easily determined. However, measuring such a time after each complete revolution of the reel has a serious disadvantage in that any changes occuring during this one revolution are not picked up until later.

In view of this, it is an object of the present invention to provide a method and apparatus for measuring the revolution time of the rotors of a brushless d-c motor whereby any changes in the duration of a revolution are detected as quickly as possible.

SUMMARY OF THE INVENTION

The present invention solves this problem by using the control signals consecutively emitted by position indicating means associated with the brushless d-c motor to couple fixed current sources to integrating storage elements in a sequence and duration corresponding to the communtation of the motor. Each storage element is then interrogated at the end of the time during which it was connected and then reset after interrogation. A preferred circuit arrangement for carrying out this method includes a motor having at least a three-pulse commutation device and having a number of storage elements equal to the number of pulses of the commutation device. The storage elements are connected through first switching elements sequentially controlled by the control signals emitted by the position indicators to a current source and for interrogation to a common integrator output. In addition, each storage element has a resetting device associated therewith controlled by the second control signals occuring after the one which operated its associated first switching element.

In accordance with the preferred embodiment, a simple circuit arrangement is achieved by using capacitors as storage elements. These capacitors are connected by the first switching elements to a constant current source. The connecting points between the switching elements and the storage capacitors are coupled through decoupling diodes to a common integration output. Also at each of these points is connected a second switching element in parallel with the storage capacitor for use in resetting. In the first illustrated embodiment, a single constant current source is provided. In a second embodiment, commutation errors and variations in components such as varying capacitor capacities are compensated by providing a separate adjustable constant current source for each capacitor. Alternatively, the current value of a single constant current source may be arranged so that it is adjustable for each separate capacitor circuit.

DETAILED DESCRIPTION OF THE PREFERRED EMBODIMENT

Figure 1:
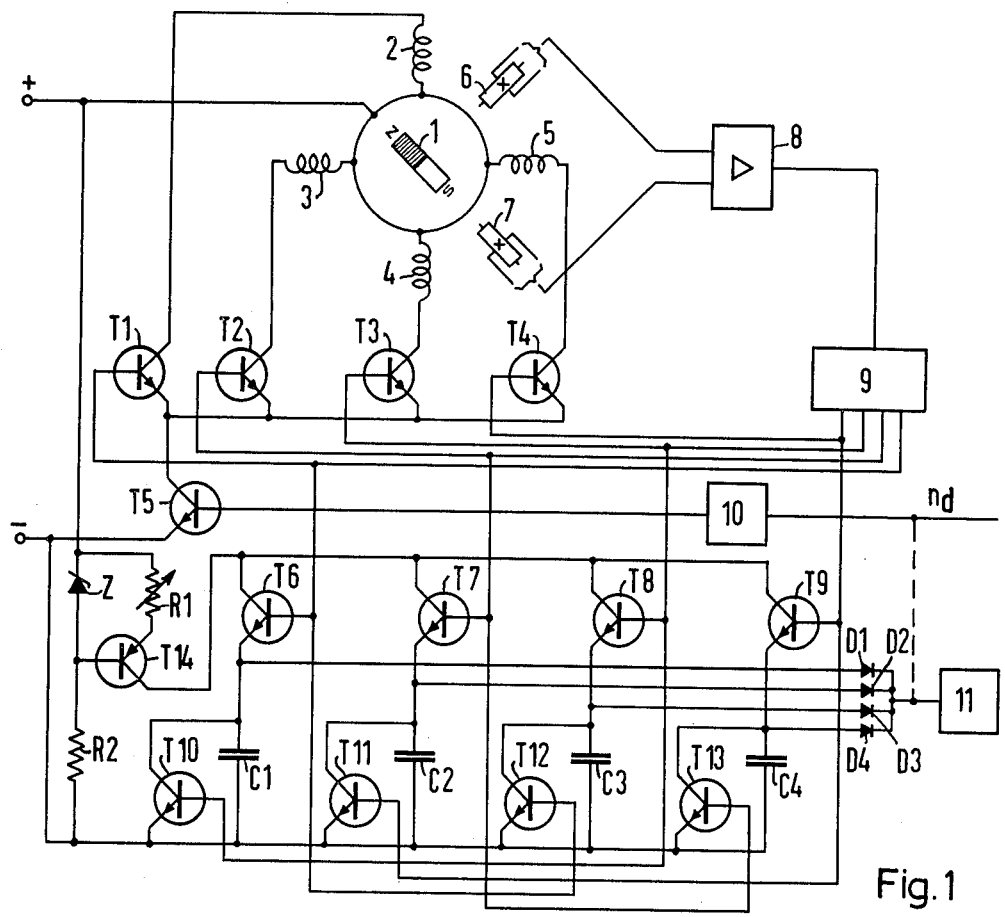
FIG. 1 is a circuit diagram of a first circuit arrangement for measuring rotor revolution time of a brushless d-c motor.

FIG. 1 is a circuit diagram showing a brushless d-c motor having a permanent magnet rotor 1 and stator windings 2, 3, 4 and 5. The indications N and S indicate the polarity of the permanent magnet rotor 1. The Hall effect generators 6 and 7 are installed such that they are 90 electrical degrees from each other within the stator of the DC motor for use as position sensors to obtain necessary commutation. In conventional fashion, the Hall output voltage terminal of Hall effect generators 6 and 7 are coupled to a Hall signal amplifier 8. The Hall signal amplifier 8 provides outputs to a control circuit 9 used for obtaining commutation. The control signals which are sequentially outputted by the control circuit 9 are coupled to the bases respectively of transistors T1, T2, T3 and T4. These transistors are connected in series with the respective stator windings 2, 3, 4 and 5. The stators are star connected and coupled to a positive voltage source and the emitters of all power transistors T1 through T4 connected together and through a regulating transistor T5 to the negative voltage. Transistor T5 is controlled by a conventional speed regulator 10 which responds to an input designated $\eta_d$ representing the desired speed. In operation, each of the windings is conducting for 90° of one rotor revolution, conduction being obtained by an appropriate signal from the control circuit 9. The magnitude of the current is controlled by the transistor T5. This portion of the circuit just described is a conventional brushless d-c motor circuit well known to those skilled in the art.

As indicated at the outset, it is desired to determine the time elapsed during one revolution of a motor such as this. In a tape recorder, two such motors are provided and by determining the times of a single rotation associated therewith, it is then possible to regulate the tape recorder speed. To make the necessary measurements there is connected to each output of the control circuit 9 in addition to a connection to the power transistors a control transistor. Thus, the control output for power transistor T1 is connected to the base of a transistor T6, that for transistor T2 to the base of T7, that for transistor T3 to the base of T8 and that for transistor T4 to the base of transistor T9. Thus, the output of control circuit 9 controls one power transistor in the motor circuit and one control transistor in the circuit of the present invention for determining the time of one revolution. The control transistors T6 through T9 have their collectors all connected together and to a constant current source to be described more fully below. Their emmitters are coupled respectively to capacitors C1, C2, C3 and C4. These transistors comprise first switching elements for the capacitors C1 through C4 which act as integrating storage devices. In addition, the circuit includes transistors T10 through T13 connected in parallel respectively with capacitors C1 through C4. These are second switching elements which act to discharge or reset the capacitors. Each of these transistors has its base coupled to one of the outputs of the control circuit 9, the exact manner of coupling to be described more fully below. Essentially, they are coupled to a control output which is two outputs later than the one turning on the control transistor associated with their capacitor. In addition, the point at which each capacitor is coupled to the emitter of its associated transistor is led off through a decoupling diode, decoupling diodes D1 through D4 being associated with the respective capacitors C1 through C4, to a common input to an interrogation device 11. In the embodiment of FIG. 1, the collectors of all control transistors T6 through T9 are coupled to the collector of a transistor T14. Transistors T14 has its base coupled to the junction between a resistor R2 and a Zener diode Z. This point will remain at a fixed voltage causing transistor T14 to form a constant current source. It has a resistor R1 in its emitter path coupling its emitter to the positive voltage. Adjustment of resistor R1 permits adjustment of the constant current output of the constant current source transistor T14.

Figure 2:
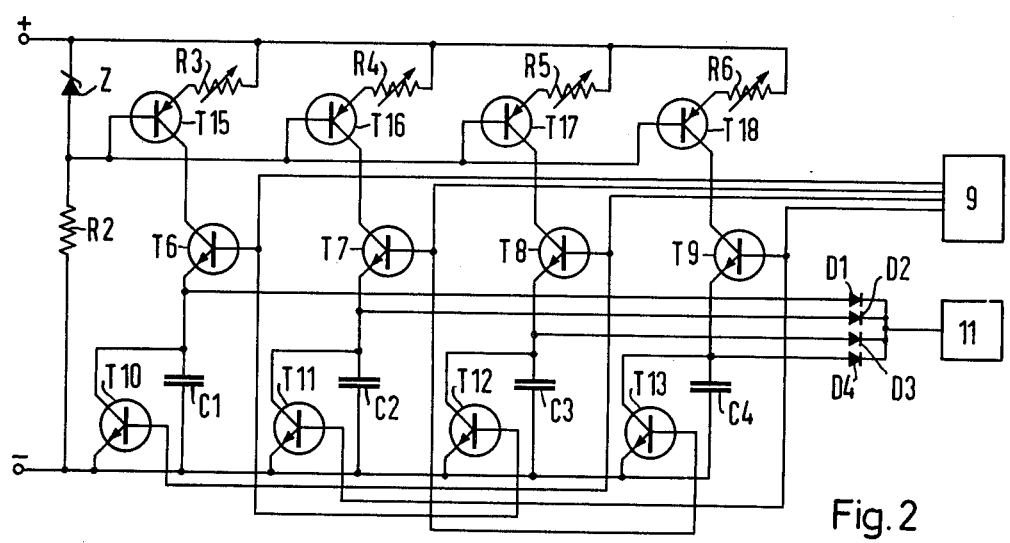
FIG. 2 is a circuit diagram showing separate constant current sources for each storage capacitor.

An alternate embodiment of the invention in which only the measuring circuits and not the motor itself are shown is illustrated by FIG. 2. The circuit is exactly the same as that described above with one exception. Rather than providing a single constant current source for all control transistors, separate constant current sources are provided for each of the transistors T6 through T9. Each of these constant current sources has the same configuration as that described above, comprising a transistor with the transistors T15 through T18 associated with the respective transistors T6 through T9. Similarly, each transistor has in its emitter path a variable resistor designated respectively R3, R4, R5, and R6. The base of each transistor is coupled to the voltage divider comprising the Zener diode Z and resistor R2 between the positive and negative voltage. The use of separate constant current sources which can be individually adjusted by their resistors R3 through R6 permits adjusting the circuit to take into account any variation between components such as transistors, capacitors, and so on.

The circuit can best be understood by describing the manner in which it operates. In conventional fashion, the control signals generated by the Hall effect generators 6 and 7 are transmitted to control circuit 9 which emits a plurality of square wave pulses each corresponding to 90° of rotation of the motor. These output pulses sequentially turn on the transistors T1 through T4. At the same time as a transistor T1 through T4 is turned on, one of the transistors T6 through T9 is also turned on to couple the constant current source to one of the capacitors. Assume that the transistor T1 is turned on by the control circuit first in time. At the same time transistor T6 will be turned on and a constant current supplied to capacitor C1. Capacitor C1 will begin to integrate this current. It will continue to charge linearly until the end of the on time for transistor T at which time transistor T1 will be turned off and another pulse from the control circuit 9 will turn on transistor T2 and transistor T7. The voltage stored in capacitor C1 is now a measure of the time required to complete one quarter of a revolution. That is, the transistor T1 and transistor T6 were turned on for 90° of rotation. Now with transistor T7 turned on, capacitor C2 begins to charge. Because of the constant current source, it too will charge linearly through the control transistor T7. The voltage stored on capacitor C1 is provided through the diode D1 to the interrogation device 11 which is now free to interrogate that capacitor to determine what its voltage is. Thus, voltage as noted above will be proportional to the time required to make one quarter revolution.

After another 90° of revolution, the power transistor T2 and control transistor T7 are turned off and the power transistor T3 and control transistor T8 turned on. At the same time, this output turns on transistor T10 to discharge capacitor C1 so that it is ready for its next cycle of operation. Capacitor C3 charges through the transistor T8. The voltage stored at capacitor C2 can now be interrogated to determine the time required to revolve through that 90°. Again, interrogation is done by the interrogation device 11 through diode D2 associated with capacitor C2. After the next 90° of rotation transistors T3 and T8 are turned off and transistors T4 and T9 are turned on. At the same time, this output is provided to transistor T11 to discharge the capacitor C2. Now, during this cycle of operation, capacitor C4 charges through transistor T9 and the voltage at capacitor C3 is provided through diode D3 to the interrogation device 11. After another 90° of rotation, the cycle repeats and continues as long as the motor is running. In the manner described above, when transistor T6 is again turned on, transistor T12 will also be turned on to discharge capacitor C3 and, when transistor T7 is turned on, transistor T13 will be turned on to discharge capacitor C4. Thus, the capacitors are sequentially discharged to make them ready for the next cycle of charging.

With the method and circuit of the present invention, a plurality of values are determined during one revolution of the permanent magnet rotor of the brushless d-c motor without the need for additional interrogation elements. Any changes occurring during the single revolution can be quickly detected and corrected through appropriate regulation. Since the measured values are directly proportional to the duration of a portion of a revolution of the permanent magnet rotor the circuit arrangement of the present invention can be particularly useful in regulating the tape velocity of a cassette type magnetic tape recorder. As described previously, the relationship that the sum of the squares of the revolution time for both motors is constant permits controlling the motor to give a constant tape velocity. The method and circuit of the present invention may also be used to regulate the speed of a brushless d-c motor particularly when other methods for determining the actual speed fails because the number of revolutions is too low. Even very slow speeds, a very accurate speed value is obtained with the present method. The actual speed value can be detected at the decoupling diode D1 through D4 and supplied directly to the speed regulator 10 as indicated by the dashed line of FIG. 1. Since the revolution time is inversely proportional to the RPM number, in some cases it may be necessary to insert in the lead to the speed regulator a divider to form a reciprocal value.

It is also possible to practice the method according to the present invention by using counters as integrating storage elements. In such a case, the output of the control circuit 9 would be used to enable these counters to receive pulses from a frequency generator providing a constant clock frequency. In that case, a gate coupling the clock frequency to the respective counters would comprise the first switching element. Furthermore, a d-c motor connected to a constant d-c voltage for the duration of the conductance of the first switching element could be used as an integrating storage element. In well known fashion, the angle of rotation of the rotor of such a d-c motor would then be a measure of the revolution time of the permanent magnet brushless d-c motor. These and other modifications may be made without departing from the spirit of the invention which is intended to be limited solely by the appended claims.

What is claimed is:

1. A method for measuring the time elapsed during one revolution of the rotor of a brushless d-c motor having a commutation device which is controlled by position indicators responsive to the rotor position, the commutation device of said brushless d-c motor emitting sequential signals to cause commutation thereof comprising the steps of:
   a. coupling a constant source to an integrating storage device for the duration of each commutation signal;
   b. upon completion of a commutation signal, interrogating the stored value in said storeage device; and
   c. after interrogation resetting said storage device.

2. A circuit for measuring the time elapsed during one revolution of the rotor of a brushless d-c motor having a commutation device of at least three pulses controlled by position indicators responsive to the rotor position, said commutation device providing sequential output control signal to cause commutation of said motor, comprising:
   a. a constant source;
   b. a plurality of storage elements equal in number to the number of pulses emitted during one rotation of said brushless motor;
   c. an equal plurality of first switching means coupling said constant source to respective ones of said storage elements, said switching elements responsive to respective ones of said control signals emitted by the commutation device;
   d. means coupling said storage elements to a common interrogation point; and
   e. a plurality of reset means, one being associated with each of said storage elements, said reset means arranged to reset its associated storage means in response to the second commutation signal following the commutation signal to which the first switching element associated with its storage element responded.

3. Apparatus according to claim 2 wherein said storage elements comprise capacitors, said constant source comprises a constant current source with said first switching elements coupling said constant current source to said capacitors, said means for providing the output of said storage elements to a common interrogation point comprises a plurality of decoupling diodes coupling the point of connection between said first switching elements and said capacitors to a common interrogation point and wherein said reset means comprise a plurality of second switching elements coupled in parallel to said capacitors.

4. Apparatus as in claim 3 and further including separate constant current sources for each of said capacitors.

5. Apparatus according to claim 3 and further including means in said constant current source for adjusting the current suppled thereby.

* * * * *